(12) United States Patent
Komaba et al.

(10) Patent No.: US 10,967,841 B2
(45) Date of Patent: Apr. 6, 2021

(54) BRAKE FLUID PRESSURE CONTROL SYSTEM FOR VEHICLE

(71) Applicant: NISSIN KOGYO CO., LTD., Ueda (JP)

(72) Inventors: Takaaki Komaba, Ueda (JP); Hiroaki Tokoi, Ueda (JP); Kouji Sakai, Ueda (JP)

(73) Assignee: Autoliv Nissin Brake Systems Japan Co., Ltd., Nagano (JP)

( * ) Notice: Subject to any disclaimer, the term of this patent is extended or adjusted under 35 U.S.C. 154(b) by 182 days.

(21) Appl. No.: 15/025,471

(22) PCT Filed: Sep. 25, 2014

(86) PCT No.: PCT/JP2014/075386
§ 371 (c)(1),
(2) Date: Mar. 28, 2016

(87) PCT Pub. No.: WO2015/046308
PCT Pub. Date: Apr. 2, 2015

(65) Prior Publication Data
US 2016/0207512 A1 Jul. 21, 2016

(30) Foreign Application Priority Data
Sep. 30, 2013 (JP) .............................. JP2013-205228

(51) Int. Cl.
*B60T 8/36* (2006.01)
*B60T 7/04* (2006.01)
(Continued)

(52) U.S. Cl.
CPC ............ *B60T 8/3635* (2013.01); *B60T 7/042* (2013.01); *B60T 8/4081* (2013.01);
(Continued)

(58) Field of Classification Search
CPC ...... B60T 7/042; B60T 8/3635; B60T 8/4081; B60T 13/146; B60T 13/662; B60T 13/686; B60T 13/745
See application file for complete search history.

(56) References Cited

U.S. PATENT DOCUMENTS 3,881,783 A * 5/1975 Shiber ................... B60T 8/1703
244/111
4,641,891 A * 2/1987 Belart ..................... B60T 8/446
188/345
(Continued)

FOREIGN PATENT DOCUMENTS

DE 102010020002 A1 * 11/2011
EP 0 280 740 A1 9/1988
(Continued)

OTHER PUBLICATIONS

English Machine Translation of IDS reference JP-200522465.*
(Continued)

*Primary Examiner* — Melody M Burch
(74) *Attorney, Agent, or Firm* — Carrier Blackman & Associates, P.C.; Joseph P. Carrier; William D. Blackman (57) ABSTRACT

A brake fluid pressure control system for a vehicle is provided with: a master cylinder activated by the operation of a brake pedal; a motor cylinder device that generates brake hydraulic pressure in response to an operation amount of the brake pedal; first brake fluid flow lines that allow the master cylinder to communicate with wheel cylinders; two-position three-way valves arranged at connection points between the first brake fluid lines and second brake fluid lines. The two-position three-way valves switch between a state in which the master cylinder communicates with the wheel cylinder and a state in which the motor cylinder device communicates with the wheel cylinder.

12 Claims, 6 Drawing Sheets

(51) Int. Cl.
*B60T 13/14* (2006.01)
*B60T 13/66* (2006.01)
*B60T 13/68* (2006.01)
*B60T 13/74* (2006.01)
*B60T 8/40* (2006.01)

(52) U.S. Cl.
CPC .......... *B60T 13/146* (2013.01); *B60T 13/662* (2013.01); *B60T 13/686* (2013.01); *B60T 13/745* (2013.01)

(56) References Cited

U.S. PATENT DOCUMENTS

| | | | | |
|---|---|---|---|---|
| 5,029,950 | A * | 7/1991 | Vennemeyer | B60T 8/4863 180/197 |
| 5,143,428 | A * | 9/1992 | Toda | B60T 8/40 303/113.5 |
| 5,302,008 | A | 4/1994 | Miyake et al. | |
| 5,320,203 | A * | 6/1994 | Wilber | F16D 25/088 192/109 F |
| 5,588,718 | A | 12/1996 | Winner et al. | |
| 5,752,750 | A | 5/1998 | Lubischer et al. | |
| 5,947,221 | A * | 9/1999 | Taniguchi | B60T 8/4872 180/197 |
| 6,206,484 | B1 * | 3/2001 | Ganzel | B60T 8/268 188/358 |
| 2008/0238646 | A1 * | 10/2008 | Hatano | B60Q 1/44 340/451 |
| 2011/0224881 | A1 * | 9/2011 | Matsushita | B60T 7/042 701/70 |
| 2011/0316328 | A1 | 12/2011 | Hatano | |
| 2012/0169112 | A1 | 7/2012 | Jungbecker et al. | |
| 2013/0207452 | A1 | 8/2013 | Gilles et al. | |

FOREIGN PATENT DOCUMENTS

| | | |
|---|---|---|
| JP | H08-506301 A | 7/1996 |
| JP | H10-132130 A | 5/1998 |
| JP | 2005-022465 A | 1/2005 |
| JP | 2010173471 A * | 8/2010 |
| JP | 2010-241314 A | 10/2010 |
| WO | 2010/106993 A1 | 9/2010 |

OTHER PUBLICATIONS

Extended European search report issued in the corresponding EP Patent Application 14847497.6 dated Apr. 7, 2017.
Office Action issued in the counterpart European patent application 14 847 497.6 dated Jan. 26, 2018.
Office Action dated Sep. 6, 2018 issued in the counterpart European patent application No. 14 847 497.6.

\* cited by examiner

FIG. 1

FIG. 2    ON DEACTIVATION

FIG. 3A
SOLENOID IN OFF-STATE

FIG. 3B
SOLENOID IN ON-STATE

FIG. 4

FIG. 5  ON ACTIVATION

FIG. 6  ON DEACTIVATION

BRAKE FLUID PRESSURE CONTROL SYSTEM FOR VEHICLE

TECHNICAL FIELD

The present invention relates to a brake fluid pressure control system for a vehicle having a brake-by-wire brake device.

BACKGROUND ART

For example, Patent Document 1 discloses a brake-by-wire brake device including: a tandem master cylinder; a slave cylinder that generates a brake pressure by an electric motor driving slave pistons to displace; and a stroke simulator that generates a reaction force in proportion to an operation amount on a brake pedal. The slave cylinder is arranged between the master cylinder and wheel cylinders.

In the brake-by-wire brake device, the tandem master cylinder activated by the brake pedal functions as a backup, and, for example, when an ignition is turned off, the master cylinder is communicated with the wheel cylinders to directly supply brake fluid in the master cylinder to the wheel cylinders.

PRIOR ART DOCUMENT

Patent Document

Patent Document 1: Japanese Patent Application Publication No. 2010-241314

SUMMARY OF THE INVENTION

Problems to be Solved

In the brake-by-wire brake device disclosed in Patent Document 1, if the power of the electric motor is turned off, for example, while the slave pistons are being displaced toward a return side (backward), the slave pistons are forced to be displaced further toward the return side (backward) by the brake hydraulic pressure supplied in the slave cylinder, to increase the volume of a fluid pressure chamber in the slave cylinder.

In addition, when the power source is shut off, a normally-open electromagnetic valve arranged between the master cylinder and the wheel cylinders is opened to communicate the master cylinder, the wheel cylinders and the slave cylinder with one another, so that a part of the brake fluid supplied from the master cylinder is filled into the fluid pressure chamber having the increased volume of the slave cylinder. This may make a driver have a different pedal feeling for the brake pedal to feel discomfort.

A general purpose of the present invention is to provide a brake fluid pressure control system for a vehicle that can avoid giving discomfort to a driver due to a change of pedal feeling.

Solution to Problems

To solve such a problem, the present invention provides a brake fluid pressure control system for a vehicle including: a master cylinder that is activated with an operation of a brake activator; a motor cylinder device that is arranged between the master cylinder and a wheel cylinder and generates a brake hydraulic pressure in response to an operation amount of the brake activator; a controller that controls for driving the motor cylinder device; a first brake fluid line that allows the master cylinder to communicate with the wheel cylinder; a second brake fluid line that is connected to the first brake fluid line and allows the motor cylinder device to communicate with the wheel cylinder; and a two-position three-way valve that is arranged at a connection point between the first brake fluid line and the second brake fluid line, wherein the two-position three-way valve is switchable between a first state in which the master cylinder communicates with the wheel cylinder and the motor cylinder device is shut off from the wheel cylinder and a second state in which the master cylinder is shut off from the wheel cylinder and the motor cylinder device communicates with the wheel cylinder.

In the present invention, for example, in a case where the two-position three-way valve is in the second state and a slave piston in the motor cylinder device is displaced at the return side (backward) and a power supply of the motor cylinder device is shut off, the two-position three-way valve can be switched to the first state to prevent brake fluid from flowing into the second brake fluid line. Thus, according to the present invention, the second brake fluid line can be opened and closed based on a condition of the system, which suitably prevents uncomfortable feeling to be given to a driver.

Further, the two-position three-way valve may be switched from the second state to the first state on the condition that the operation of the brake activator is released. With this operation, when the brake activator is not operated, the master cylinder communicates with the wheel cylinder. For example, when the two-position three-way valve is formed of a solenoid valve, the two-position three-way valve is in the second state when the solenoid is on, and is in the first state when the solenoid is off. Consequently, when the brake activator is not operated, the first state can be set to a solenoid in an OFF-state to reduce consumption power for conducting the solenoid.

Still further, a first fluid pressure detector that detects a brake hydraulic pressure may be arranged on the second brake fluid line. With this structure, the two-position three-way valve can be switched in association with the brake hydraulic pressure detected by the first fluid pressure detector on a side connected to the motor cylinder device.

Yet further, a second fluid pressure detector that detects a brake hydraulic pressure may be arranged on the first brake fluid line between the two-position three-way valve and the wheel cylinder. With this structure, when the brake hydraulic pressure on a side of the valve connected to the wheel cylinder is detected to be higher than a predetermined value via the second fluid pressure detector, the high brake hydraulic pressure can be released by switching the two-position three-way valve.

Furthermore, two slave pistons arranged inside the motor cylinder device may be of plunger type and are freely displaced backward without being coupled with each other. With this structure, for example, the tandem slave pistons arranged inside the motor cylinder device can have a simple structure, resulting in an easy assembly operation.

Advantageous Effects of the Invention

The present invention can provide a brake fluid pressure control system for a vehicle that can suitably avoid making a driver have a different pedal feeling to feel discomfort.

EMBODIMENTS OF THE INVENTION

Hereinafter, embodiments of the present invention will be described in detail with reference to drawings appropriately.

Figure 1:
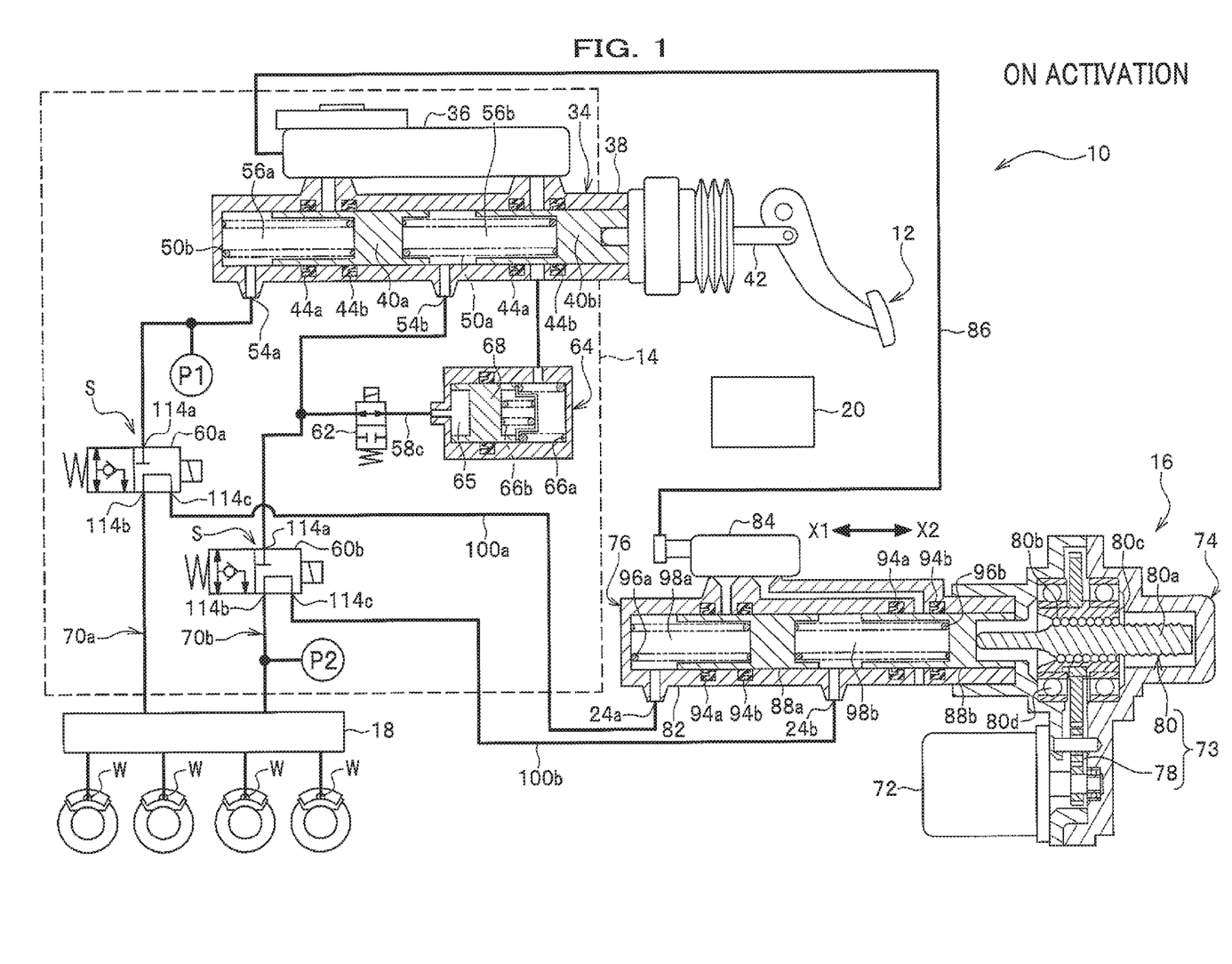
FIG. 1 is a circuit diagram of fluid pressure at the time of activation of a brake fluid pressure control system for a vehicle according to an embodiment of the present invention.

A brake fluid pressure control system for a vehicle 10 shown in FIG. 1 includes: a by-wire brake system that transmits electric signals to cause a brake to be activated; and a conventional hydraulic brake system that transmits hydraulic pressure to cause the brake to be activated at the time of power off and fail-safe.

Thus, as shown in FIG. 1, the brake fluid pressure control system for a vehicle 10 basically includes: an input device 14 through which operation is inputted when a brake pedal (brake activator) 12 is operated by a driver (operator); a motor cylinder device 16 that generates brake hydraulic pressure; a behavior stabilizer 18 that supports stabilizing vehicle behavior; and a controller (control device) 20 that controls for driving the motor cylinder device 16. It is noted that the input device 14 and the motor cylinder device 16 may be assembled in one piece. In addition, in each drawing, signal lines connected to the controller 20 are omitted.

The input device 14, the motor cylinder device 16 and the behavior stabilizer 18 are, for example, connected by a fluid pressure line that is formed of pipe material such as a hose and a tube, and the input device 14 is electrically connected to the motor cylinder device 16 by a harness (not shown) as a by-wire brake system.

The behavior stabilizer 18 is, as shown in FIG. 1, connected to each wheel cylinder W via a pipe tube. The behavior stabilizer 18 includes a structure that is capable of executing various fluid pressure control such as anti-lock brake control and behavior stabilizing control by appropriately controlling the brake fluid applied to each wheel cylinder W of a wheel brake. For example, the behavior stabilizer 18 includes a fluid pressure unit provided with solenoid valves, pumps and the like, a motor for driving the pumps, an electronic controller for controlling the solenoid valves and the motor, and the like, which are not shown.

It is noted that the brake hydraulic pressure system for vehicle 10 can be mounted, in various vehicles inclusive of an automobile that is driven only by an engine (internal combustion engine), a hybrid automobile, an electric automobile, and a fuel cell automobile.

The input device 14 includes a tandem master cylinder 34 that can generate the brake hydraulic pressure with stepping operation on the brake pedal 12 by the driver, and a first reservoir 36 attached to the master cylinder 34. Inside a cylinder tube 38 of the master cylinder 34, two pistons 40a, 40b are slidably arranged apart from each other at a given distance along the axial direction of the cylinder tube 38.

The piston 40b is arranged closely to the brake pedal 12 so as to be connected thereto via a push-rod 42 for linear motion. On the other hand, the other piston 40a is arranged farther from the brake pedal 12 than the piston 40b.

A pair of cup seals 44a, 44b are mounted respectively in annular grooves formed on an inner circumferential surface of the cylinder tube 38. Further, a spring member 50a is arranged between the piston 40a and the piston 40b, and the other spring member 50b is arranged between the piston 40a and a side end of the cylinder tube 38. It is noted that the pair of cup seals 44a, 44b may be mounted in annular grooves formed on outer circumferential surfaces of the pair of pistons 40a, 40b. The cylinder tube 38 of the master cylinder 34 has two output ports 54a, 54b. Further, a first pressure chamber 56a and a second pressure chamber 56b that generate the brake hydraulic pressure in response to a tread force on the brake pedal 12 by the driver are provided in the cylinder tube 38 of the master cylinder 34.

The fluid pressure line includes a first brake fluid line for communicating the master cylinder 34 with the wheel cylinder W, and a second fluid line connected to the first brake fluid line via connection points S.

The first brake fluid line includes a first brake fluid line 70a from the first pressure chamber 56a of the master cylinder 34 to two of the four wheel cylinders W, and a second brake fluid line 70b from the second pressure chamber 56b of the master cylinder 34 to the other two of the four wheel cylinders W.

The second brake fluid line is arranged to allow the motor cylinder device 16 to communicate with the wheel cylinders W, including a second brake fluid line 100a from a first fluid pressure chamber 98a of the motor cylinder device 16 to the first brake fluid line 70a, and a second brake fluid line 100b from a second fluid pressure chamber 98b of the motor cylinder device 16 to the second brake fluid line 70b.

The second brake fluid line 100a and second brake fluid line 100b are specifically formed with piping tubes that connect connection ports on the device body of the input device 14 to output ports 24a, 24b of the motor cylinder device 16, and holes formed in the device body of the input device 14.

Two-position three-way valves 60a, 60b composed of solenoid valves are respectively arranged at the connection points S between the first brake fluid line 70a and the second brake fluid line 100a and between the first brake fluid line 70b and the second brake fluid line 100b. The two-position three-way valve 60a and two-position three-way valve 60b are formed identically. The two-position three-way valves 60a, 60b can switch from a first state to a second state or vice versa, where the first state is such that the master cylinder 34 communicates with the wheel cylinders W and the motor cylinder 16 is shut off from the wheel cylinders W, and the second state is such that the master cylinder 34 is shut off from the wheel cylinders W and the motor cylinder device 16 communicates with the wheel cylinders W.

A first pressure sensor P1 is arranged on the first brake fluid line 70a between the two-position three-way valve 60a and the master cylinder 34. The first pressure sensor P1 is arranged to be closer to the master cylinder 34 than to the two-position three-way valve 60*a* and detects the fluid pressure in the first brake fluid line 70*a*. A detection signal detected by the first pressure sensor P1 is outputted to the controller 20.

A second pressure sensor (second fluid pressure detector) P2 is arranged on the second brake fluid line 70*b* between the two-position three-way valve 60*b* and the wheel cylinders W. The second pressure sensor P2 detects the fluid pressure in the first brake fluid line 70*b* on a downstream side of the two-position three-way valve 60*b*. Further, the second pressure sensor P2 detects the pressure of the brake fluid in the wheel cylinders W when the behavior stabilizer 18 is not activated.

Figure 2:
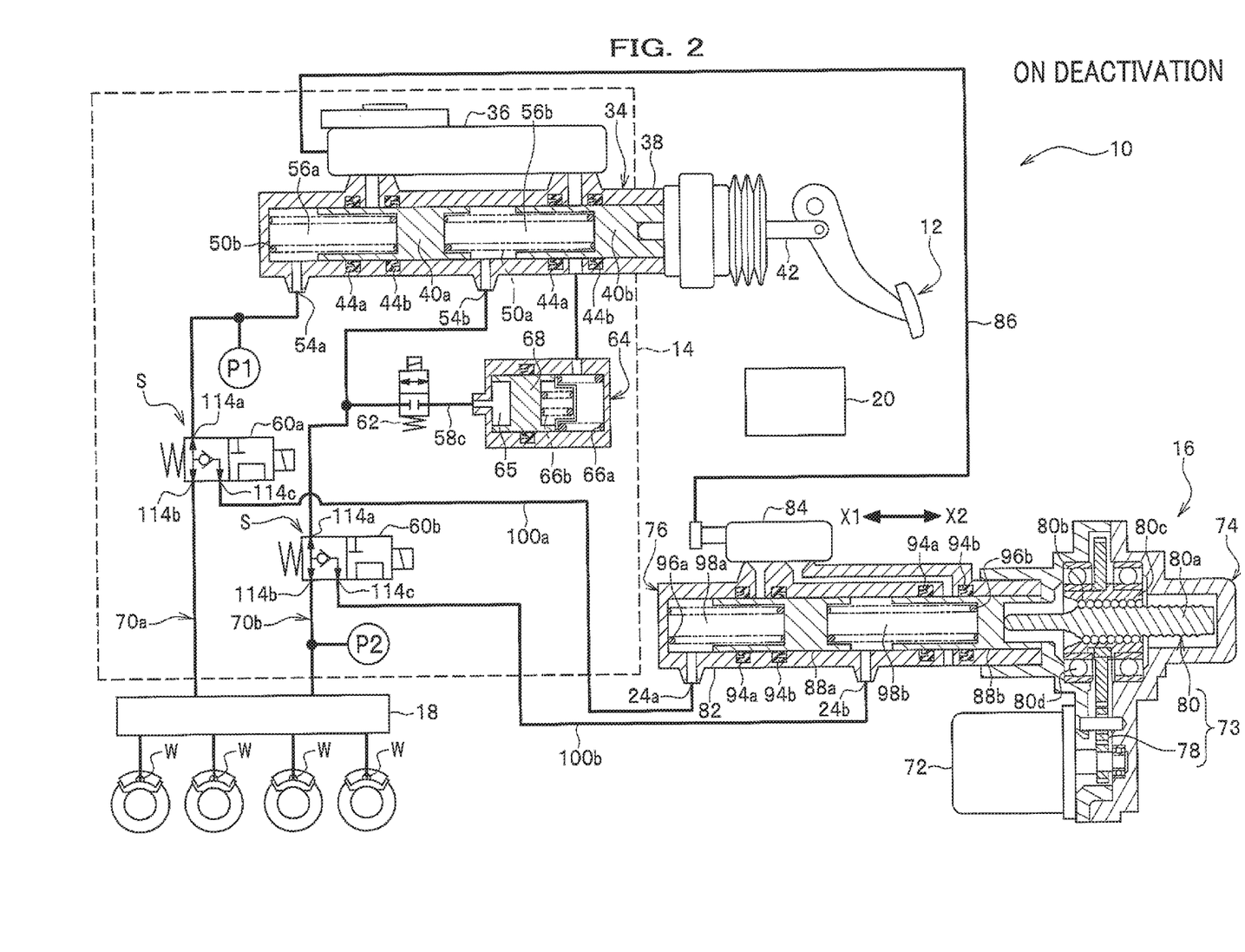
FIG. 2 is a circuit diagram of fluid pressure at the time of deactivation of the brake fluid pressure control system for a vehicle shown in FIG. 1.

It is noted that FIG. 1 shows the two-position three-way valves 60*a*, 60*b* of which solenoids are energized so as to be in an ON-state, and FIG. 2 shows the solenoids which are not energized so as to be in an OFF-state.

Next, a structure and effects of the two-position three-way valves 60*a*, 60*b* will be described referring to FIG. 3A, FIG. 3B and, FIG. 4. It is noted that, since the two-position three-way valves 60*a*, 60*b* are structured identically, the two-position three-way valve 60*a* will be described in detail and the two-position three-way valve 60*b* will not be described.

Basically, the two-position three-way valve 60*a* includes a valve body 100 acting as a fixed core, a valve seat member 102, a displacement mechanism 106 including a valve body 104, a movable core 108 and a coil unit 110.

The valve body 100 is formed of a substantially cylindrical body having a through hole 112 penetrating in the axial direction. The valve body 100 includes first to third ports 114*a*-114*c*. As shown in FIG. 4, the first port 114*a* is formed at one end along the axial direction of the valve body 100 and is connected to communicate with the master cylinder 34 via the first brake fluid line 70*a*. The second port 114*b* is formed in an intermediate portion of the valve body 100 adjacent to the first port 114*a*, and is connected to the wheel cylinders W via the first brake fluid line 70*a*. The third port 114*c* is formed in another intermediate portion of the valve body 100, and is connected to the brake cylinder device 16 via the second brake fluid line 100*a*. The valve seat member 102, the displacement mechanism 106 including the valve body 104, and a third filter 116 are accommodated in the through hole 112 of the valve body 100. The third filter 116 prevents foreign matters from entering into a stepped hole 126 from the third port 114*c*.

A first filter 118 for covering the first port 114*a* is mounted at an opening of one end of the valve body 100. Further, a second filter 120 for covering the second port 114*b* is mounted on the outer circumferential surface of the intermediate portion of the valve body 100.

The valve seat member 102 includes a first valve seat member 102*a* and a second valve seat member 102*b* arranged downward apart from the first valve seat member 102*a* at a predetermined distance. The first valve seat member 102*a* and the second valve seat member 102*b* are respectively pressed into and secured (retained) in the valve body 100 from a lower end of the valve body 100.

The first valve seat member 102*a* is made of a substantially cylindrical body having a large diameter part 122 and a small diameter part 124 formed in one piece. The stepped hole 126 is formed in the first valve seat member 102*a* to penetrate the first valve seat member 102*a*. On the bottom surface of the first valve seat member 102*a* (lower opening edge of the stepped hole 126), a first seat 128 is formed on which the spherical valve body 104 is seated.

The second valve seat member 102*b* is composed of a substantially cylindrical body that is formed with an annular step 129 on its upper outer circumferential surface. Inside the second valve seat member 102*b*, a stepped hole 130 is formed to penetrate the second valve seat member 102*b*. On the upper surface of the second valve seat member 102*b* (upper opening edge of the stepped hole 130), a second seat 132 is formed on which the spherical valve body 104 is seated.

The displacement mechanism 106 includes: the spherical valve body 104; an elongated stem 134 that is displaceably arranged along the through hole 112 of the valve body 100; a retainer 136 that retains the valve body 104; and a first spring member 138 that biases the valve body 104 in a direction where the valve body 104 is seated on the first seat 128.

The stem 134 includes a shaft part 140 and a sliding part 142. The shaft part 140 is abuttably arranged on the valve body 104. Further, the shaft part 140 presses the valve body 104 toward the second seat 132 against spring force of the first spring member 138. The sliding part 142 slides along the through hole 112 of the valve body 100.

The retainer 136 is formed of a substantially bottomed cylindrical body and is slidably arranged along the outer circumferential surface of the small diameter part 124 of the first valve seat member 102*a*. A holding hole 144 for holding the valve body 104 is formed at the center of the bottom surface of the retainer 136. The inner diameter of the holding hole 144 is set to be smaller than the outer diameter of the valve body 104. Further, on the upper outer circumferential surface of the retainer 136, a flange 146 is formed which radially extends outward to lock the first spring member 138.

The first spring member 138 has the upper end engaged with the flange 146 of the retainer 136, and the lower end engaged with the annular step 129 of the second valve seat member 102*b*. The first spring member 138 biases the retainer 136 by its spring force toward the first valve seat member 102. The valve body 104 is pressed to seat on the first seat 128 by the spring force of the first spring member 138.

The movable core 108 is formed of a substantially cylindrical body made of a magnetic body to be arranged on the valve body 100. On the upper side of the valve body 100, a bottomed cylindrical cap member 148 is fixed to its outer circumferential surface. The movable core 108 is accommodated in the cap member 148 to be slidable along the axial direction of the movable core 108.

A second spring member 150 is interposed between the movable core 108 and the cap member 148. The second spring member 150 functions, when the solenoid is switched from ON to OFF, as a cushion to avoid unusual noise that is generated when the upper end surface of the movable core 108 contacts the inner wall of the cap member 148. The spring force of the second spring member 150 is set to be smaller than that of the first spring member 138.

The coil unit 110 is arranged to surround a part of the valve body 100 and a part of the cap member 148. The coil unit 110 is formed of a substantially cylindrical bobbin (not shown) and a coil (solenoid) wound around the bobbin.

It is noted that an O-ring 152 is mounted on the outer circumferential surface of the valve body 100 between the second port 114*b* and the third port 114*c*. The O-ring 152 seals a gap space so as not to allow the second port 114*b* to communicate with the third port 114*c* in a state that the two-position three-way valve 60*a* is attached in a hole 14*b* (see FIG. 4) of a base 14*a* constituting the input device 14.

Motions of the two-position three-way valve 60*a* structured as above will be briefly described below.

Figures 3A, 3B:
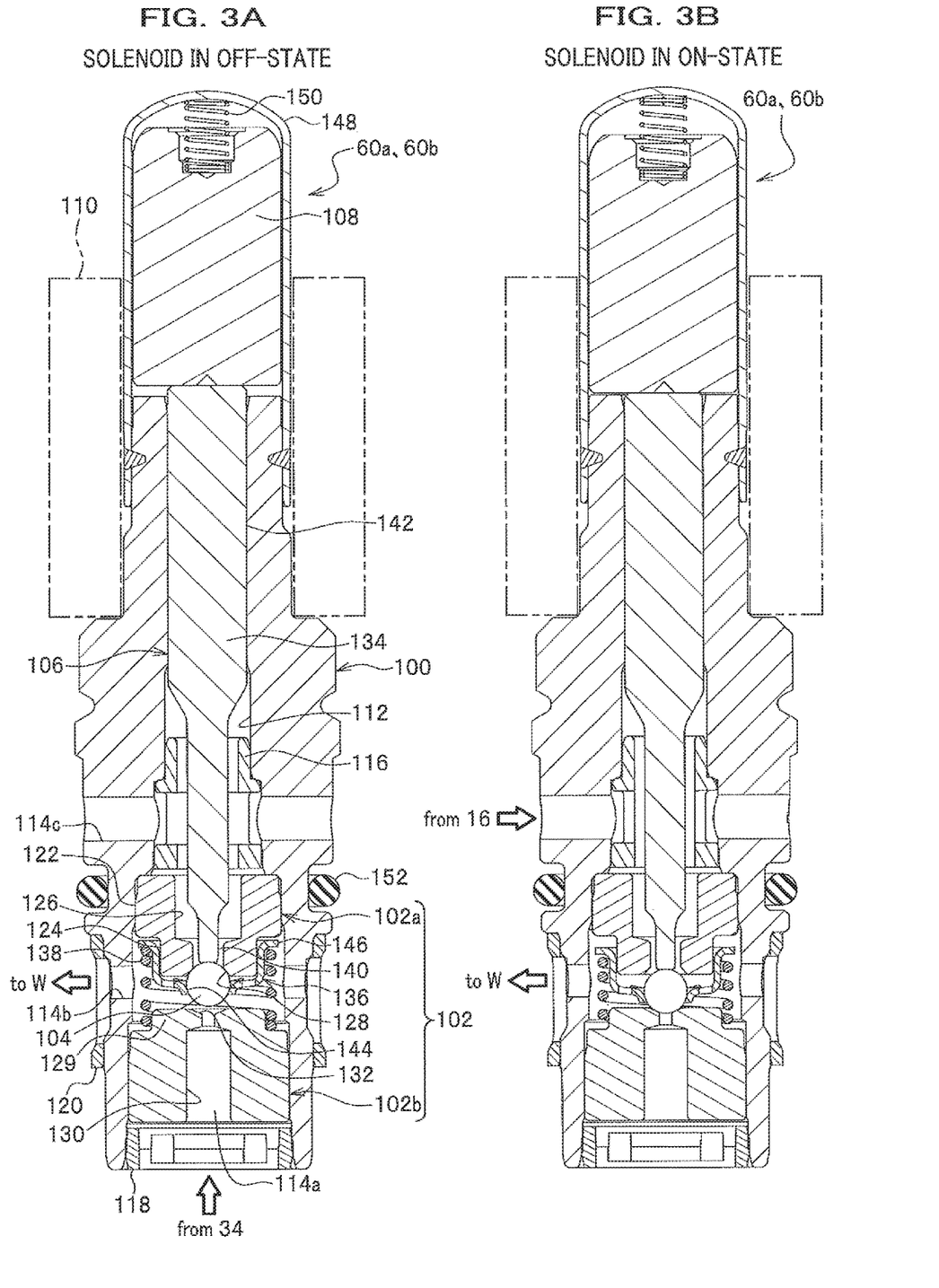
FIG. 3A is a vertical cross-sectional view showing a two-position three-way valve with a solenoid in an OFF-state which is installed in the brake fluid pressure control system for a vehicle shown in FIG. 1.
FIG. 3B is a vertical cross-sectional view showing the two-position three-way valve with a solenoid in an ON-state.

As shown in FIG. 3A, with a solenoid in an OFF-state where the coil unit 110 is not energized, the valve body 104 is seated on the first seat 128 of the first valve seat member 102*a* by the spring force of the first spring member 138. In this state, since the second seat 132 is not closed by the valve body 104 but open, the first port 114*a* is in communication with the second port 114*b* (see the arrow in FIG. 3A).

Figure 4:
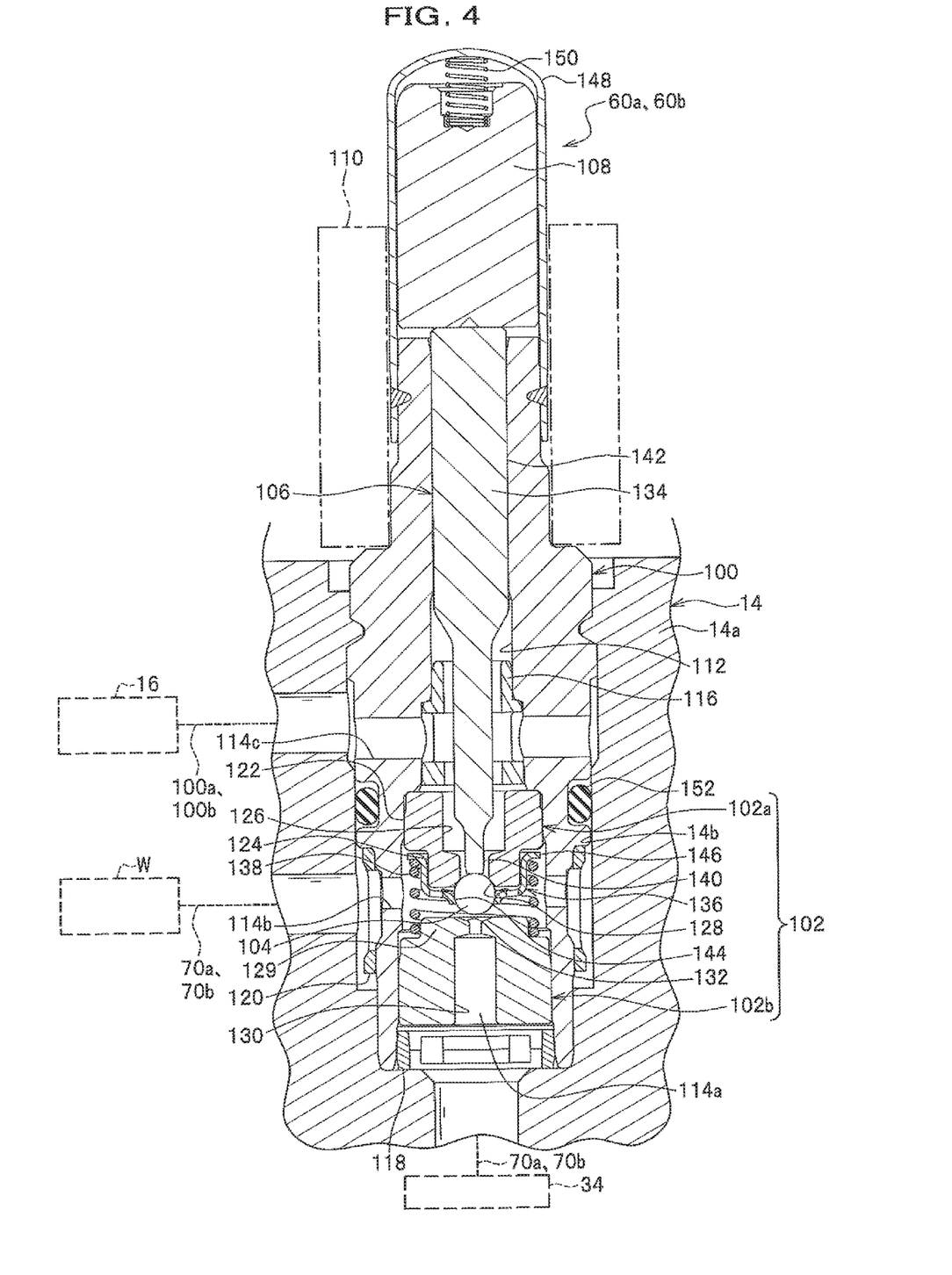
FIG. 4 is a vertical cross-sectional view showing the two-position three-way valve as installed in a base of an input device.

As shown in FIG. 4, the master cylinder 34 is in communication with the wheel cylinders W by the first port 114*a* communicating with the second port 114*b*, and the motor cylinder 16 is out of communication with the wheel cylinders W by the second port 114*b* being shut off from the third port 114*c*. As a result, the two-position three-way valve 60*a* with the solenoid in an OFF-state allows the brake hydraulic pressure in the master cylinder 34 to be transmitted to the wheel cylinders W.

On the other hand, when the coil unit 110 is energized and excited, magnetic flux is generated vertically so as to pass through the movable core 108 in the coil unit 110, causing the movable core 108 to be displaced downward (toward the valve body 100). This makes the movable core 108 press down the stem 134, and the shaft part 140 of the stem 134 presses the valve member 104 downward by the pressing force. Consequently, the valve body 104 is separated from the first seat 128 against the spring force of the first spring member 138.

The valve body 104 is separated from the first seat 128 and further the valve body 104 is pressed down by the shaft part 140 of the stem 134, to eventually cause the valve body 104 to be seated on the second seat 132 of the second valve seat member 102*b*. It is noted that, when the valve body 104 is pressed and displaced by the shaft part 140 of the stem 134, the retainer 136 retaining the valve body 104 slides along the outer circumferential surface of the small diameter part 124 of the first valve seat member 102*a*.

With the valve body 104 is seated on the second seat 132 of the second valve seat member 102*b*, the second port 114*b* is in communication with the third port 114*c* (see the arrow in FIG. 3B). As shown in FIG. 3B, by the second port 114*b* communicating with the third port 114*c*, the motor cylinder device 16 is in communication with the wheel cylinders W, and the first port is shut off from the second port so as not to allow the master cylinder to communicate with the wheel cylinders. As a result, the two-position three-way valve 60*a* with the solenoid in an ON-state allows the brake hydraulic pressure in the motor cylinder device 16 to be transmitted to the wheel cylinders W.

It is noted that, in the two-position three-way valve 60*a* with the solenoid in an ON-state, if energization to the coil unit 110 is stopped, the valve body 104 is separated from the second seat 132 by the spring force of the first spring member 138, and further, the valve body 104 is returned to the initial state (original position) where the valve body 104 is seated on the first seat 128.

Referring back to FIG. 1, the push-rod 42 is set to have an ineffective piston stroke (idle stroke) (not shown) with which the piston 40*a* is not displaced even if the brake pedal 12 is operated. The ineffective piston stroke allows for detecting that the driver begins to step down the brake pedal 12. When a stroke sensor (not shown) detects the ineffective stroke, the controller 20 energizes the solenoids in the two-position three-way valves 60*a*, 60*b* to switch the two-position three-way valves 60*a*, 60*b* from the solenoid being in an OFF-state (see FIG. 3A) to the solenoid being in an ON-state (see FIG. 3B). On the other hand, when the driver releases his/her foot from the brake pedal 12 and the stroke sensor detects that the brake has been released, the controller 20 stops energizing the solenoids, which consequently causes the two-position three-way valve 60*a*, 60*b* to be returned to have the solenoid in an OFF-state.

On the first brake fluid line 70*b* between the master cylinder 34 and the two-position three-way valve 60*b*, a branch fluid pressure line 58*c* branched therefrom is arranged. A shut-off valve 62 as a normally-closed solenoid valve and the stroke simulator 64 are connected to the branch fluid pressure line 58*c* in series. The normally-closed shut-off valve 62 refers to a valve structured such that a normal position (position of the valve body while not energized) is closed (normally-closed). It is noted that FIG. 1 shows the shut-off valve 62 being open where the solenoid is energized and the valve body (not shown) is activated, and FIG. 2 shows the shut-off valve 62 being closed where the solenoid is not energized. The shut-off valve 62 is switched to be open when the ignition switch (not shown) is turned on, and is switched to be closed when the ignition switch (not shown) is turned off.

Under the by-wire control, the stroke simulator 64 functions as a device that generates reaction force in response to the stroke on the brake pedal 12 to give a feeling to the driver as if braking force is generated by a tread force on the brake pedal 12. The stroke simulator 64 is arranged on the first brake fluid line 70*b* to be closer to the master cylinder 34 than the two-position three-way valve 60*b*. The stroke simulator 64 includes a fluid pressure chamber 65 that communicates with the branch fluid pressure line 58*c*. The brake fluid is discharged from the second pressure chamber 56*b* of the master cylinder 34 to the fluid pressure chamber 65.

Further, the stroke simulator 64 includes: a first return spring 66*a* having a higher spring constant and a second return spring 66*b* having a lower spring constant arranged in series with each other; and a simulator piston 68 biased by the first and second return springs 66*a*, 66*b*, and sets pedal feeling on the brake pedal 12 to be equivalent to that as is with the existing master cylinder.

The motor cylinder device 16 includes an actuator mechanism 74 having an electric motor 72 and a driving force transmitter 73, and a cylinder mechanism 76 that is biased by the actuator mechanism 74.

The driving force transmitter 73 of the actuator mechanism 74 includes a gear mechanism (deceleration mechanism) 78 that transmits rotational driving force of the electric motor 72, and a ball screw structure (conversion mechanism) 80 that converts the rotational driving force to linear motion (axial force in a linear direction) to transmit the linear motion to a first slave piston 88*a* and a second slave piston 88*b* of the cylinder mechanism 76.

The electric motor 72 is composed of, for example, a servo motor that is controlled for driving based on control signals (electric signals) from the controller 20. In addition, the electric motor 72 is driven based on a pedal stroke on the brake pedal 12 detected by the stroke sensor (not shown).

The ball screw structure 80 includes: a ball screw shaft (rod) 80*a* of which one end along the axial direction abuts on the second slave piston 88*b* of the cylinder mechanism 76; a plurality of balls 80*b* that roll along a spiral screw groove formed on the outer circumferential surface of the ball screw shaft 80*a*; a nut member 80*c* in a substantially cylindrical shape that is fitted into a ring gear of the gear mechanism 78 to integrally rotate therewith and to be screwed on the balls 80*b*; and a pair of ball bearings 80*d* for rotatably supporting one end and the other end of the nut member 80c in the axial direction, respectively. It is noted that the nut member 80c is, for example, fixed by press fitting on the inner surface of the ring gear in the gear mechanism 78.

With the driving force transmitter 73 structured as above, the rotational driving force of the electric motor 72 transmitted via the gear mechanism 78 is inputted to the nut member 80c to be converted to the axial force in the linear direction (linear motion) by the ball screw structure 80, and consequently, the ball screw shaft 80a is moved back and forth along the axial direction.

The motor cylinder device 16 transmits the driving force of the electric motor 72 via the driving force transmitter 73 to the first and second slave pistons 88a, 88b of the cylinder mechanism 76 to drive the first and second slave pistons 88a, 88b forward, causing the brake hydraulic pressure to be generated. That is, the motor cylinder device 16 includes the electric motor 72 that is driven based on the pedal stroke, and the two plunger pistons (first and second slave pistons 88a, 88b) that move back and forth with the rotation of the electric motor 72 and that are free to displace backward without being coupled with each other. It is noted that, in the following description, the displacement of the first and second slave pistons 88a, 88b in the arrow X1-direction (see FIG. 1) is referred to as "forward movement" and the displacement in the arrow X2-direction (see FIG. 1) is referred to as "backward movement". Besides, the arrow X1 indicates the "front", and the arrow X2 indicates the "back".

The cylinder mechanism 76 includes a bottomed cylindrical cylinder body 82 and a second reservoir 84 that is attached to the cylinder body 82. The cylinder mechanism 76 is of a tandem-type in which the two plunger pistons (first and second slave pistons 88a, 88b) are arranged in series in the cylinder body 82. Since the two pistons, that is, the first and second slave pistons 88a, 88b which are free to displace backward without being coupled with each other are used, the tandem piston structure arranged in the motor cylinder device 16 can be simplified and the pistons can be assembled into the cylinder body 82.

The second reservoir 84 is connected to the first reservoir 36 attached to the master cylinder 34 of the input device 14 via a pipe tube 86, so that the brake fluid stored in the first reservoir 36 is supplied to the second reservoir 84 via the pipe tube 86.

The first slave piston 88a is arranged to face the first fluid pressure chamber 98a at the front in the cylinder body 82. A first spring 96a is arranged between the first slave piston 88a and the side end (bottom wall) of the cylinder body 82 to press the first slave piston 88a backward (in the arrow X2-direction).

The second slave piston 88b is arranged so as to face the second fluid pressure chamber 98b at the rear (in the arrow X2-direction) of the first slave piston 88a. A second spring 96b is arranged between the first and second slave pistons 88a, 88b, to bias the first slave piston 88a and second slave piston 88b in a direction separating from each other.

It is noted that the second slave piston 88b is arranged in proximity to the ball screw structure 80 to abut on one end of the ball screw shaft 80a so as to integrally displace with the ball screw shaft 80a in the arrow X1-direction or the arrow X2-direction. Further, the first slave piston 88a is arranged at a position farther from the ball screw structure 80 than the second slave piston 88b.

A pair of cup seals 94a, 94b are mounted in annular grooves on the inner circumferential surface of the cylinder body 82, respectively, for each slave piston. It is noted that the pair of cup seals 94a, 94b may also be mounted in annular grooves formed in the outer circumferential surfaces of the first and second slave pistons 88a, 88b.

The two output ports 24a, 24b are formed on the cylinder body 82 of the cylinder mechanism 76. Further, the cylinder body 82 includes the first fluid pressure chamber 98a that controls the brake hydraulic pressure outputted from the output port 24a to the wheel cylinders W and the second fluid pressure chamber 98b that controls the brake hydraulic pressure outputted from the output port 24b to the wheel cylinders W.

The brake fluid pressure control system for a vehicle 10 according to the present embodiment is basically structured as described above, and its operation and effects will be described below.

At the time of activation of the brake fluid pressure control system for vehicle 10, as shown in FIG. 1, the two-position three-way valves 60a, 60b arranged at the connection points S are excited by energization to have the solenoid in an ON-state (see FIG. 3B), and the shut-off valve 62 as a normally-closed solenoid valve is excited by energization to be open. When the two-position three-way valves 60a, 60b have the solenoid in an ON-state, the second ports 114b are communicated with the third ports 114c, allowing the motor cylinder device 16 to communicate with the wheel cylinders W via the second brake fluid line 100a and the second brake fluid line 100b. On the other hand, since the two-position three-way valves 60a, 60b shut off the first brake fluid line 70a and the first brake fluid channel 70b, the brake hydraulic pressure (first brake hydraulic pressure) generated in the master cylinder 34 of the input device 14 is not transmitted to the wheel cylinders W.

At this time, the brake hydraulic pressure generated in the second pressure chamber 56b of the master cylinder 34 is transmitted to the fluid pressure chamber 65 of the stroke simulator 64 via the branch fluid pressure line 58c and the shut-off valve 62 in an open state. The simulator piston 68 is displaced by the brake hydraulic pressure supplied to the fluid pressure chamber 65 against the spring force of the first and second return springs 66a, 66b, to accept the stroke on the brake pedal 12 and to generate pseudo pedal reaction to be applied to the brake pedal 12. As a result, the brake feeling without discomfort can be given to the driver.

In the activated state of the brake fluid pressure control system for vehicle 10 above, for example, when the pedal stroke is outputted from the stroke sensor (not shown), the controller 20 drives the electric motor 72 of the motor cylinder 16 to energize the actuator mechanism 74, and causes the first and second slave pistons 88a, 88b to be displaced (to move forward) toward the arrow X1-direction against the spring force of the first and second springs 96a, 96b. The first and second slave pistons 88a, 88b displace to pressurize the brake fluid in the first and second fluid pressure chambers 98a, 98b to be balanced, thereby generating the brake hydraulic pressure in response to the pedal stroke.

The brake hydraulic pressure of the first and second fluid pressure chambers 98a, 98b in the motor cylinder device 16 is transmitted to the wheel cylinders W via the second brake fluid lines 100a, 100b and the behavior stabilizer 18, and the wheel cylinders W are activated to apply desired braking force to each wheel.

In other words, when the brake fluid pressure control system for a vehicle 10 is in a state where the motor cylinder device 16 that functions as a power fluid pressure source, an ECU for by-wire control (not shown) or the like can be activated, the motor cylinder device 16 is activated in a state where the two-position three-way valves 60a, 60b shut off the communication between the master cylinder 34 and the wheel cylinders W.

In contrast, for example, when the motor cylinder device 16 is not activated (on deactivation), as shown in FIG. 2, the two-position three-way valves 60a, 60b respectively have the solenoid in an OFF-state, to allow the first port 114a to communicate with the second port 114b and to shut off the second brake fluid lines 100a, 100b. Consequently, the communication between the motor cylinder 16 and the wheel cylinders W is shut off, and the brake hydraulic pressure (first brake hydraulic pressure) generated by the master cylinder 34 is applied to the wheel cylinders W.

In the present embodiment, for example, if the power source of the electric motor 72 for driving the motor cylinder device 16 is shut off while the first slave piston 88a of the motor cylinder device 16 is being displaced toward the return side (back) in the arrow X2-direction, the two-position three-way valves 60a, 60b are switched to have the solenoid in an OFF-state by switching signals outputted from the controller 20 (or by stopping energization to the coil unit 110), to make the first brake fluid line 70a in communication with the first brake fluid line 70b, and to shut off the second brake fluid lines 100a, 100b. This prevents the brake fluid supplied from the master cylinder 34 from partially flowing toward the motor cylinder device 16. Consequently, in the present embodiment, it is possible to suitably avoid giving discomfort to the driver without changing the pedal feeling. As discussed, such control operation as discussed above occurs in conjunction with brake-by-wire operations of the system wherein the motor cylinder device 16 supplies brake fluid pressure to the wheel cylinders W, or in other words during normal braking operations including a brake-by-wire operation when the brake activator is released by the driver of the vehicle so that power of the motor cylinder device has been shut off, and the controller then switches the two-position three-way valve to the first state to prevent brake fluid from flowing into the second brake fluid line and hence from partially flowing toward the motor cylinder device.

Further, in the present embodiment, when the stroke sensor (not shown) detects that the stepping operation on the brake pedal 12 is started, the controller 20 switches the two-position three-way valves 60a, 60b to have the solenoid in an ON-state. In the present embodiment, the first brake fluid lines 70a, 70b are shut off by the two-position three-way valves 60a, 60b, and the second brake fluid line 100a is in communication with the second brake fluid line 100b, to allow the wheel cylinders W to be activated by the brake hydraulic pressure that is controlled by the motor cylinder device 16. Thus, by activating the two-position three-way valves 60a, 60b only when the brake pedal 12 is operated, power consumption can be reduced.

Further, in the present embodiment, for example, when the stroke sensor (not shown) detects that the driver releases the stepping operation on the brake pedal 12 (when the driver releases his/her foot from the brake pedal 12), the controller 20 switches the two-position three-way valves 60a, 60b to have the solenoid in an OFF-state. In the present embodiment, when the brake pedal 12 is not operated by the driver, the valve body 104 can be easily returned to the initial position so as to be seated on the first seat 128 by the spring force of the first spring member 138. Therefore, in the present embodiment, the power consumption for energizing the solenoids of the two-position three-way valves 60a, 60b can be saved.

Still further, in the present embodiment, when either one of the first brake fluid lines 70a, 70b fails (at the time of hemi-system failure), the controller 20 controls the two-position three-way valves 60a, 60b to have the solenoid in an OFF-state to shut off the second brake fluid line 100a and the second brake fluid line 100b, respectively, so as to prevent the redundant brake fluid from flowing toward the motor cylinder device 16.

Yet further, in the present embodiment, the two-position three-way valves 60a, 60b can be controlled by the controller 20 so as to have the solenoid in an OFF-state, respectively, to shut off the second brake fluid lines 100a, 100b, respectively. As a result, a situation can be suitably avoided, in which the volume of the first and second fluid pressure lines 98a, 98b in the motor cylinder device 16 is increased due to the displacement of the first and second slave pistons 88a, 88b.

In this case, in order to prevent the displacement (over-returning with respect to the predetermined position) of the first and second slave pistons 88a, 88b, for example, it is conceivable that the displacement of the first and second slave pistons 88a, 88b is regulated by a connecting pin that is fixed to the cylinder body 82. However, with the structure, the cylinder mechanism 76 of the motor cylinder device 16 becomes complex to make the production cost soar. In the present embodiment, by arranging the two-position three-way valves 60a, 60b at the connection points S between the first brake fluid lines 70a, 70b and the second brake fluid lines 100a, 100b, respectively, the over-returning of the first and second slave pistons 88a, 88b can be avoided at a lower cost.

Next, a check function of the two-position three-way valves 60a, 60b will be described.

In a state at the time of deactivation shown in FIG. 2 where the solenoid is in an OFF-state (see FIGS. 3A and 4) to have the valve body 104 seated on the first seat 128, when the brake hydraulic pressure of the first fluid pressure chambers 98a, 98b of the motor cylinder device 16 becomes high, for example, the high-pressure brake fluid flows into the two-position three-way valves 60a, 60b via the third ports 114c to press down the valve bodies 104. The pressing force for pressing the valve bodies 104 overcomes the spring force of the first spring members 138, to make the valve bodies 104 separated from the first seats 128.

Therefore, the high-pressure brake fluid on a side closer to the motor cylinder device 16 can flow toward the wheel cylinders W and/or the master cylinder 34 via the first brake fluid lines 70a, 70b. Thus, even if the two-position three-way valve 60a, 60b have the solenoid in an OFF-state where the solenoids are not energized when the brake hydraulic pressure on a side connected to the motor cylinder device 16 becomes high, for example, the brake hydraulic pressure on the side connected to the motor cylinder device 16 can be released toward the master cylinder 34 and/or the wheel cylinders W with the check function that allows the brake fluid to flow only from the side of the valve connected to the motor cylinder device 16 toward the wheel cylinders W and/or the master cylinder 34.

Figure 5:
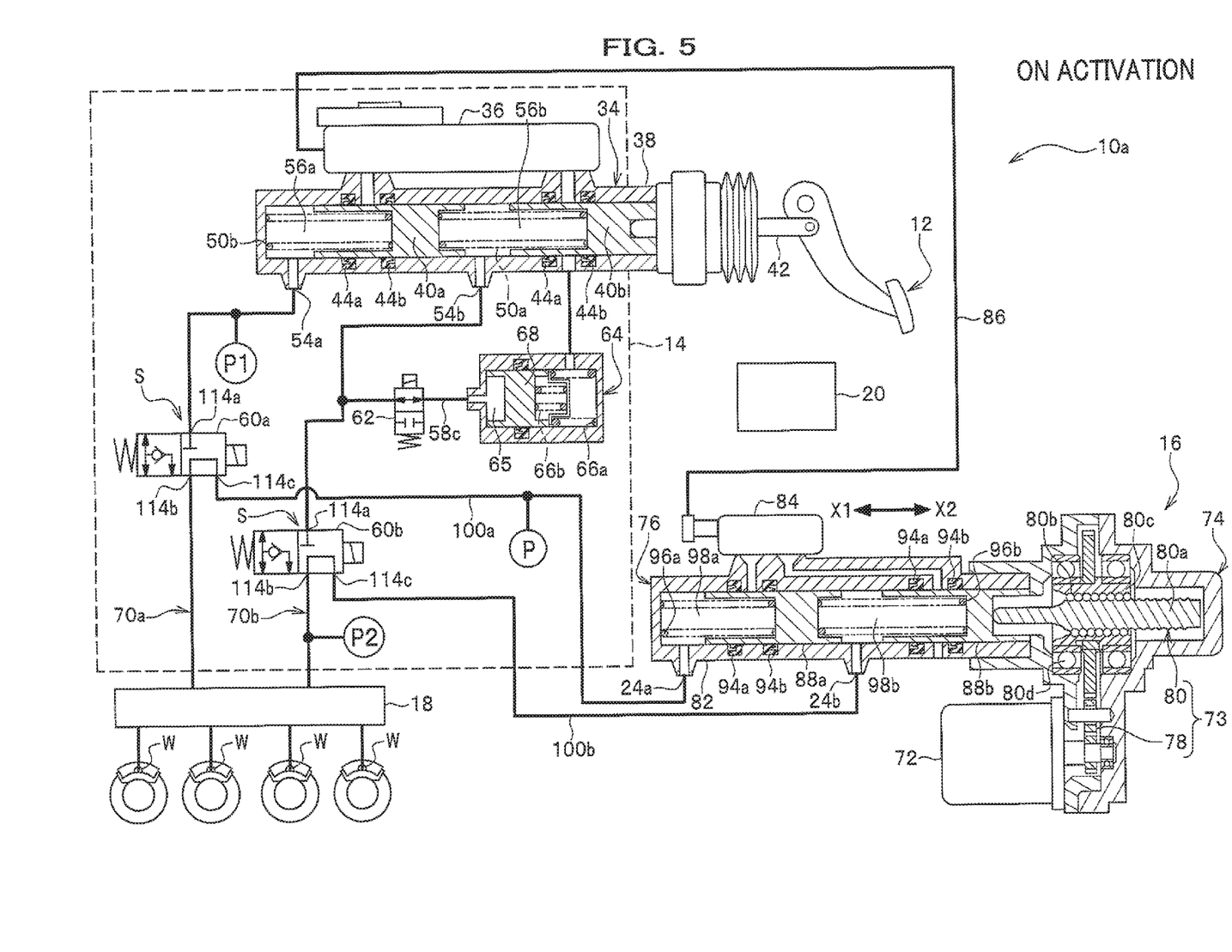
FIG. 5 is a circuit diagram of fluid pressure at the time of activation of a brake fluid pressure control system for a vehicle according to another embodiment of the present invention.
Figure 6:
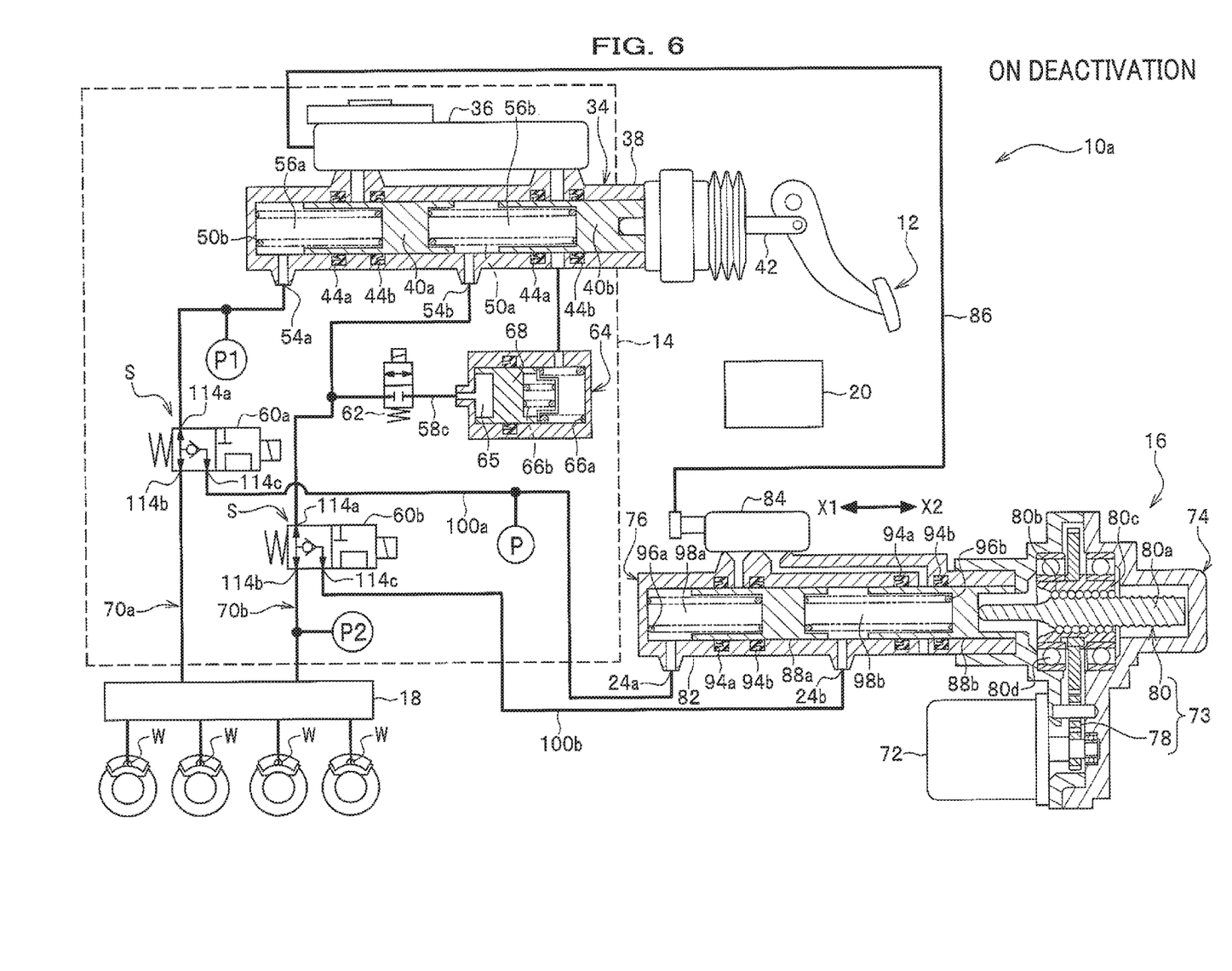
FIG. 6 is a circuit diagram of fluid pressure at the time of deactivation of the brake fluid pressure control system for a vehicle shown in FIG. 5.

FIG. 5 is a circuit diagram of fluid pressure at the time of activation of the brake fluid pressure control system for a vehicle according to another embodiment of the present invention, and FIG. 6 is a circuit diagram of fluid pressure at the time of deactivation of the brake fluid pressure control system for a vehicle shown in FIG. 5. It is noted that, in another embodiment, the same structure elements as those in the first embodiment shown in FIGS. 1 and 2 are denoted by the same reference numerals, and descriptions thereof will be omitted.

The brake fluid pressure control system for a vehicle 10*a* shown in FIGS. 5 and 6 is different from that according to the embodiment as described above on the point that a pressure sensor P (first fluid pressure detector) for detecting the brake hydraulic pressure in the first pressure chamber 98*a* of the motor cylinder 16 is arranged on the second brake fluid line 100*a* between the two-position three-way valve 60*a* and the motor cylinder device 16.

The fluid pressure controlled by the motor cylinder device 16 is detected by the pressure sensor P, and a detection signal associated with the controlled fluid pressure is outputted from the pressure sensor P to the controller 20. With this structure, the controller 20 can switch the valve position of the two-position three-way valve 60*a* in response to the brake hydraulic pressure in the first fluid pressure chamber 98*a* of the motor cylinder device 16 detected by the pressure sensor P.

For example, if the detected value of the pressure sensor P is equal to or greater than a predetermined value, the controller 20 switches the two-position three-way valve 60*a* from a state with the solenoid being OFF to a state with the solenoid being ON. With this structure, if the pressure sensor P detects that the brake hydraulic pressure in the first fluid pressure chamber 98*a* of the motor cylinder 16 is higher than the predetermined value, the brake hydraulic pressure can be released toward the behavior stabilizer 18 via the two-position three-way valve 60*a*.

DESCRIPTION OF REFERENCE NUMERALS

10, 10*a*: brake fluid pressure control system for a vehicle
12: brake pedal (brake activator)
16: motor cylinder device
20: controller (control device)
34: master cylinder
60*a*, 60*b*: two-position three-way valve
70*a*: first brake fluid line
70*b*: first brake fluid line
88*a*: first slave piston
88*b*: second slave piston
100*a*: second brake fluid line
100*b*: second brake fluid line
P: pressure sensor (first fluid pressure detector)
P2: second pressure sensor (second fluid pressure detector)
W: wheel cylinder

The invention claimed is:

1. A brake-by-wire, brake fluid pressure control system for a vehicle comprising:
   a master cylinder that is activated by operating a brake activator;
   a motor cylinder device that is arranged between the master cylinder and a wheel cylinder and generates a brake hydraulic pressure in response to an operation amount of the brake activator;
   a controller that controls for driving the motor cylinder device in relation to brake-by-wire braking operations;
   a first brake fluid line that allows the master cylinder to communicate with the wheel cylinder;
   a second brake fluid line that is connected to the first brake fluid line and allows the motor cylinder device to communicate with the wheel cylinder; and
   a two-position three-way valve that is arranged at a connection point between the first brake fluid line and the second brake fluid line, wherein during brake-by-wire braking operations involving brake hydraulic pressure generated by the motor cylinder device the two-position three-way valve is switchable between a first state in which the master cylinder communicates with the wheel cylinder and the motor cylinder device is shut off from the wheel cylinder and a second state in which the master cylinder is shut off from the wheel cylinder and the motor cylinder device communicates with the wheel cylinder, and during a brake-by-wire braking operation when operation of the brake activator is released by a driver of the vehicle and power of the motor cylinder device is shut off, the controller switches the two-position three-way valve to the first state to prevent brake fluid from flowing into the second brake fluid line.

2. The brake fluid pressure control system for a vehicle according to claim 1, wherein a fluid pressure detector that detects a brake hydraulic pressure is arranged on the second brake fluid line.

3. The brake fluid pressure control system for a vehicle according to claim 1, wherein a fluid pressure detector that detects a brake hydraulic pressure is arranged on the first brake fluid line between the two-position three-way valve and the wheel cylinder.

4. The brake fluid pressure control system for a vehicle according to claim 1, wherein two slave pistons arranged inside the motor cylinder device are plunger pistons and are movable relative to each other and a spring is disposed between the pistons.

5. The brake fluid pressure control system for a vehicle according claim 2, wherein another fluid pressure detector that detects a brake hydraulic pressure is arranged on the first brake fluid line between the two-position three-way valve and the wheel cylinder.

6. The brake fluid pressure control system for a vehicle according to claim 2, wherein two slave pistons arranged inside the motor cylinder device are plunger pistons and are movable relative to each other and a spring is disposed between the pistons.

7. The brake fluid pressure control system for a vehicle according to claim 3, wherein two slave pistons arranged inside the motor cylinder device are plunger pistons and are movable relative to each other and a spring is disposed between the pistons.

8. The brake fluid pressure control system for a vehicle according to claim 1, wherein the two-position three-way valve includes a biasing member configured to press a valve body of the valve to a motor cylinder side.

9. The brake fluid pressure control system for a vehicle according to claim 1, further comprising and a stroke simulator and a shut-off valve, the stroke simulator generates reaction force that is applied to the brake activator, and both the stroke simulator and shut-off valve are disposed on a branch line from the two-position three-way valve.

10. The brake fluid pressure control system for a vehicle according to claim 1, wherein the motor cylinder provides brake fluid pressure for operating the wheel cylinder based on the operation amount of the brake activator during the brake-by-wire braking operations of the brake system.

11. The brake fluid pressure control system for a vehicle according to claim 1, wherein the brake-by-wire braking operation during which the controller switches the two-position three-way valve to the first state is not a failsafe operation.

12. The brake fluid pressure control system for a vehicle according to claim 1, wherein the controller switches the two-position three-way valve to the second state only when the brake activator is actuated by the driver.

\* \* \* \* \*